J. M. Johnston,
Saw
No. 90,365.  Patented May 25, 1869.
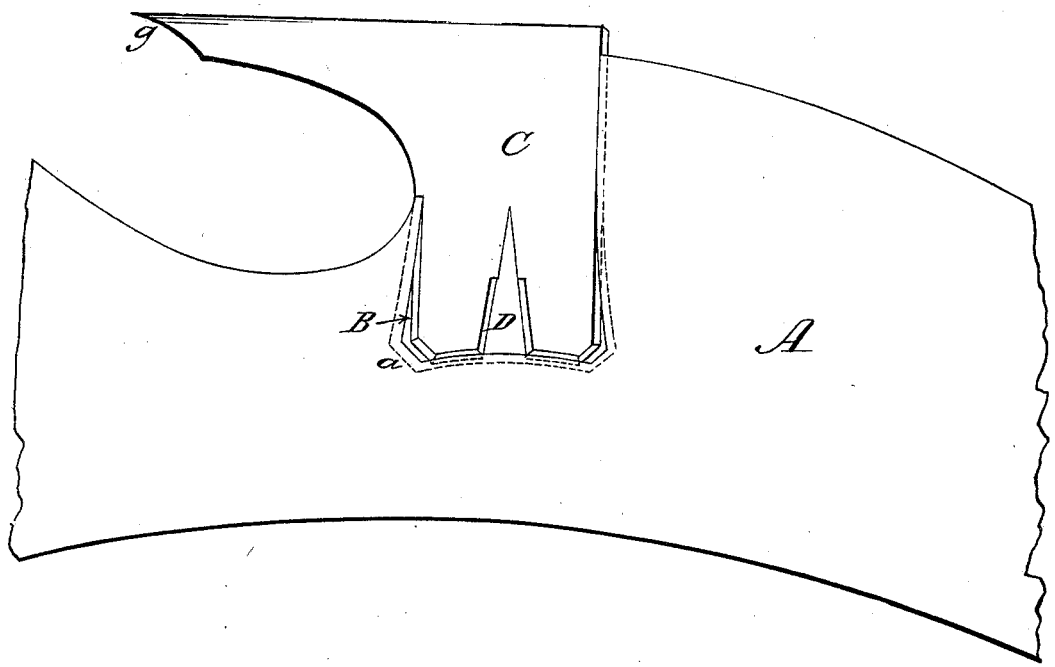
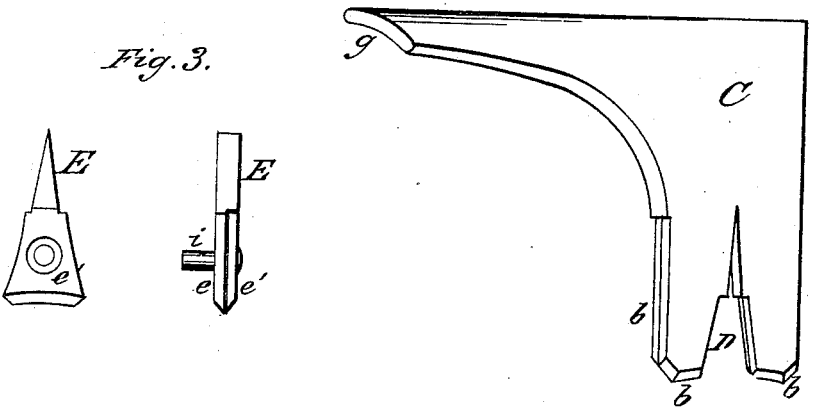
Witnesses
J. L. Boone.
Geo. H. Strong.
Inventor.
Jno. M. Johnston.
By Dewey & Co
his Attys.

United States Patent Office.

JOHN M. JOHNSTON, OF MAYFIELD, CALIFORNIA.

Letters Patent No. 90,365, dated May 25, 1869.

IMPROVEMENT IN SAWS AND SAW-TEETH.

The Schedule referred to in these Letters Patent and making part of the same.

*To all whom it may concern:*

Be it known that I, JOHN M. JOHNSTON, of Mayfield, county of Santa Clara, and State of California, have invented Improvements in Saw-Teeth and Saw-Plates; and I do hereby declare the following description and accompanying drawings are sufficient to enable any person skilled in the art or science to which it most nearly appertains, to make and use my said invention or improvements, without further invention or experiment.

My improvements relate to that class of saws or saw-plates in which detachable or removable teeth are inserted into recesses or sockets in the edge or periphery of the saw-plate, and are secured therein by various means; and They consist in making the sockets or recesses into which the teeth are to be fitted widest at the bottom.

The body of the tooth, or that portion which fits into the recess, is made of a uniform width, and has a recess in its lower end of a wedge-shape.

The tooth slides down into the recess in the plate, and a small wedge, of peculiar construction, is placed in the wedge-shaped recess, and when the tooth is driven down, the wedge gradually expands the lower portion of the tooth until it fits in the socket and the wedge fits in the wedge-shaped recess.

To more fully illustrate and explain my invention, reference is had to the accompanying drawings, forming part of this specification, of which—

Figure 1 is a view of the saw-plate and tooth.

Figure 2 is a perspective view of a tooth.

Figure 3 is a view of the device for fixing the tooth in its place.

Similar letters of reference in each of the figures, indicate like parts.

A is a section of the plate of a circular or other saw, into which teeth are to be inserted, at the proper or desired distance apart, which will necessarily vary with the size of the saw-plate and the quality of work which it is intended to perform.

I make recesses B, for the reception of the teeth.

The sides and ends of the recesses are made in curves, and where corners would be formed by the meeting of the curved sides and ends, as at *a*, I cut the plate so as to form a line which will stand at an angle of about forty-five degrees to the sides and ends The sides are curved in such a manner as to make the lower portion of the recess wider than the upper portion, and the edges are grooved around the entire recess, as shown in fig. 1, dotted lines.

The sides of the tooth C, or the portion which fits into the recess, is made straight, and of a uniform width.

The lower end is made so as to fit the bottom of the recess and the angular corners, and the edges of the sides and ends which are received in the recess are bevelled on each side, so as to fit in the groove or channel in the recess, as shown at *b*.

In the lower end of the tooth I make a wedge-shaped recess, D, extending up as far as the separation between the sides of the tooth and the recess extends. The sides of the lower portion of this recess are also bevelled on each side.

The wedge E is composed of two pieces of metal, *e* *e'*, riveted together, the portion *e* carrying the point of the wedge. Below the point it is reduced to one-half of its thickness, and the sides bevelled.

The portion *e'* corresponds exactly with the lower portion of *e*, and when the two are placed together and secured by the rivet *i*, they form the wedge, the bevelled sides forming a groove. The base of the wedge E is bevelled, so as to fit into the channel in the lower end of the recess.

To fit the tooth, the wedge E is first placed in the bottom of the recess, near the centre, and the tooth is placed in the groove and slid down as far as it will go, the wedge entering the wedge-shaped recess in the tooth, after which, by a few well-directed blows, the tooth will be forced downward and expanded by the wedge until it fits tightly in the socket prepared for it. The point of the wedge is made slightly hollowing, so as to accommodate itself to the curve of the side of the socket.

When it is desired to remove the tooth, the rivet *i* is taken out, when the portion *e'* of the wedge E will be released, and the wedge can be taken out, when, by pressing together the lower ends of the tooth, it can easily be removed.

The cutting-point *g* of the tooth is hollowed out, similar to the gouge used by wood-workers, and thus presents many advantages for cutting not obtainable in the ordinary tooth; among others, that of clearing its own track of all dust which may be occasioned by its passing through the wood.

By this mode of constructing and inserting saw-teeth, a great advantage is had both in the effective operation and strength of the saw. The danger of splitting or cracking is no greater than in any of the saws now in use, and the cost of their manufacture will be no greater.

Having thus described my invention,

What I claim as new, and desire to secure by Letters Patent, is—

In combination with the wedge-shaped recess D, cut in the base of the tooth, the wedge E, consisting of two pieces, riveted together, and provided with bevelled edges, substantially as and for the purpose set forth.

In witness whereof, I have hereunto set my hand and seal.

JOHN M. JOHNSTON. [L. S.]

Witnesses:
J. L. BOONE,
GEO. H. STRONG.